United States Patent Office 3,793,270
Patented Feb. 19, 1974

3,793,270
POLYAMIDES FROM THE REACTION OF PHENOLIC NUCLEUS CROSS-LINKED DIMER, A DIAMINE, AND A MONOCARBOXYLIC FATTY ACID
Atsushi Goukon, Yasuyuki Kawakatsu, Wataru Yano, and Itsuo Minakata, Wakayama, Japan, assignors to Kao Soap Co., Ltd., Tokyo, Japan
No Drawing. Filed Dec. 27, 1971, Ser. No. 212,667
Claims priority, application Japan, Dec. 29, 1970, 46/126,390
Int. Cl. C08g 20/26
U.S. Cl. 260—18 N                        5 Claims

ABSTRACT OF THE DISCLOSURE

New polyamides are prepared by reacting a diamine, a fatty acid of 1–24 carbon atoms and phenolic, nucleus-cross-linked dimeric acid ester or a dimeric acid which is a hydrolysis product of said ester (hereinafter referred to as "nucleus-cross-linked dimers") obtained by addition polymerization of 2 moles of an unsaturated fatty acid/lower alcohol ester and 1 mole of phenol or a phenol derivative (hereinafter referred to as "phenols"), which nucleus-cross-linked dimer is composed of two molecules of the unsaturated fatty acid ester linked together through an aromatic nucleus of one molecule of the phenol.

CROSS-REFERENCE TO RELATED APPLICATIONS

This application is related to copending application Ser. No. 206,440, filed Dec. 9, 1971, and entitled "Process for Preparing Novel Dimer Acid Esters," now abandoned.

BACKGROUND OF THE INVENTION

Field of the invention

The present invention relates to novel polyamides.

Description of the prior art

The preparation of polyamides from polymerized fatty acids and polyalkylenepolyamines and the use of the resulting polyamides as, for example, binders for printing inks is known. However, conventional polyamides are not satisfactory with respect to their weather resistance. In many cases, deterioration is caused by exposing the polyamides to air, sunlight or high temperature or by storage for a long period of time. Indexes to the deterioration of polyamides are, for example, putrid smell, increase in viscosity and reduction in gloss.

The object of the present invention is to provide new polyamides free from these defects. Polyamides of excellent weather resistance can be prepared by using nucleus-cross-linked dimers as starting materials.

SUMMARY OF THE INVENTION

According to the present invention, polyamides are prepared by a dehydration condensation reaction of (1) a nucleus-cross-linked dimer, (2) a diamine and (3) a monofunctional reactant for regulating the molecular weight of the polyamide to be obtained.

The nucleus-cross-linked dimeric acid esters are prepared by an acid catalyzed reaction of (A) 2 moles of an ester, derived from an unsaturated fatty acid of 10–22 carbon atoms and a saturated alcohol of 1–8 carbon atoms, with (B) 1 mole of a phenol of the following general formula:

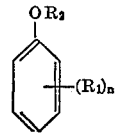

wherein $R_1$ is an alkyl group of 1–4 carbon atoms or OH, $R_2$ is H. $CH_3$ or $CH_3CH_2$ and $n$ is 0, 1 or 2, with the proviso that at least two of the o- and p-positions to $OR_2$ are unsubstituted. The nucleus-cross-linked dimeric acids are obtained by hydrolysis of the thus obtained nucleus-cross-linked dimeric acid esters.

Suitable diamines are the conventionally used aliphatic, alicyclic and aromatic diamines of the general formula:

$$R(NH_2)_2$$

wherein R is a hydrocarbon residue of 1–8 carbon atoms, such as ethylenediamine, 1,3-propylenediamine, 1,2-propylenediamine, tetramethylenediamine, pentamethylenediamine, hexamethylenediamine, p-xylenediamine, m-xylenediamine, p-phenylenediamine, m-phenylenediamine and cyclohexanediamine.

Suitable monofunctional reactants for regulating the molecular weight of the polyamide may be any saturated or unsaturated, straight or branched-chain fatty acids of 1–24 carbon atoms and mixtures of them.

As catalyst, known acid catalysts suitable for catalyzing the dehydration condensation reaction, such as phosphoric acid, may be used. The reaction may also be carried out in the absence of catalyst.

The condensation reaction is carried out generally at 200–250° C. for about 3–20 hours, preferably 5–10 hours. For preventing coloring, the reaction may be carried out under an inert gas stream, such as nitrogen. For accelerating the reaction, the reaction may be effected under reduced pressure.

The invention also includes the polyamidation of a reaction system in which the ingredient (1) is a mixture of (a) a conventional polymerized fatty acid or its ester and (b) nucleus-cross-linked dimers according to the present invention. Conventional polymerized fatty acids are ordinary polymerization products of unsaturated fatty acids of 12–18 carbon atoms and the amounts of the above (a) and (b) are in the range of (a) 0 to 80 (equiv.) to (b) 100 to 20 (equiv.).

The preferred proportions of the starting materials in the polyamidation reaction according to the present invention are within the following range:

|  | Equivalent (mole) |
| --- | --- |
| Dimer | 0.476 (0.238)–0.353 (0.176) |
| Fatty acid | 0.024 (0.024)–0.147 (0.147) |
| Diamine | 0.50 (0.25)–0.50 (0.25) |

The optimum proportions comprise 0.5 equivalent of diamine, 0.45–0.38 equivalent of dimer and 0.05–0.12 equivalent of fatty acid.

EXAMPLES 1–5

In an autoclave, 80 kg. of conjugated methyl esters of safflower fatty acids (A.V. 18.9; S.V. 190.9; I.V. 170.3), 12.9 kg. of phenol and 8 kg. of activated clay were charged and the mixture was reacted at 230° C. for 8 hours. The activated clay was removed by filtration. The phenol was distilled out under reduced pressure and then the methyl esters of fatty acids and adduct thereof with phenol was distilled out by means of a thin film evaporator to obtain methyl esters of nucleus-cross-linked dimeric acid which was nucleus-cross-linked with phenol. The product was hydrolyzed to obtain dimeric acids nucleus-cross-linked with phenol (hereinafter referred to as "A"). Analytical values (physical constants) of A were as follows:

| | |
| --- | --- |
| Acid value (A.V.) | 173.2 |
| Saponification value (S.V.) | 173.6 |
| Iodine value (I.V.) | 72.5 |
| Hydroxyl value (OH.V.) | 46.4 |

Various polyamides were prepared using A. The results are shown in Tabe 1. The condensation reaction was effected at 230° C. for 6 hours.

TABLE 1

| Example number | Starting materials | | | | | | Produced polyamides | | | | |
| --- | --- | --- | --- | --- | --- | --- | --- | --- | --- | --- | --- |
| | Dimeric acid | Wt. (g.) | Polyamine | Wt. (g.) | Monofunctional reactant | Wt. (g.) | A.V. | TAmV. | OH.V. | Viscosity of solution, cp. | Softening point, °C. |
| 1 | A | 1,000 | Ethylene diamine | 129 | Sperm fatty acid | 250 | 6.0 | 0.2 | 47.0 | 59 | 101 |
| 2 | A | 1,000 | do | 115 | do | 150 | 3.9 | 7.8 | 49.5 | 178 | 100 |
| 3 | {A (Dimeric acid) | 500 500 } | do | 121 | do | 185 | 4.3 | 1.8 | 27.8 | 168 | 108 |
| 4 | A | 1,000 | do | 116 | Stearic acid | 174 | 2.9 | 3.9 | 48.3 | 114 | 109 |
| 5 | A | 1,000 | do | 121 | Acetic acid | 56 | 6.0 | 2.9 | 50.3 | 90 | 112 |

NOTES:
TAmV.: Total amine value.
Viscosity of solution: Measured in 35% solution of toluene/isopropanol=2/1 by weight at 25° C.

Dimeric acid: Dimeric acid obtained by polymerization of safflower oil fatty acids under heating.
Softening point: Measured by ring and ball apparatus (ASTM, E28-58T).

EXAMPLES 6–17 AND COMPARATIVE EXAMPLES 1–2

Various polyamides were prepared from ethylenediamine, fatty acids and nucleus-cross-linked dimers different from those in Examples 1–5. The molar proportion of unsaturated fatty acid esters to phenols used in the preparation of the nucleus-cross-linked dimers were 2:1. The reactions were carried out under the same conditions as in Examples 1–5. The dehydration condensation reactions were carried out in the same manner as in Examples 1–5, namely, at 230° C. for 6 hours.

Blocking test: Aluminum foils were printed with the above inks, dried with air for a day and irradiated with ultraviolet rays with a Fade Meter (FA–2) of Toyo Rika Kogyo Co. at 60° C. for 20 hours. The printed surfaces were placed on top of one another and kept under a load of 500 g./cm.$^2$ at 60° C. for 24 hours and, thereafter, degrees of blocking of the printed aluminum foil surfaces were observed.

Results: No blocking was found in inks containing the polyamides obtained in Examples 1–17, while complete blocking was found in inks containing polyamides obtained from commercial dimeric acids in Comparative Examples 1–2 and separation of the printed aluminum foil surfaces from each other was difficult.

TABLE 2

| Example number | Starting materials | | | | | | Produced polyamides | | | | |
| --- | --- | --- | --- | --- | --- | --- | --- | --- | --- | --- | --- |
| | Dimeric acid | Wt. (g.) | Polyamine | Wt. (g.) | Monofunctional reactant | Wt. (g.) | A.V. | TAmV. | OH.V. | Viscosity of solution, cp. | Softening point, °C. |
| 6 | B | 1,000 | Ethylene-diamine | 101 | Sperm fatty acid | 90 | 3.2 | 5.7 | 79.8 | 120 | 81 |
| 7 | B | 1,000 | do | 108 | Acetic acid | 36.1 | 3.8 | 2.3 | 80.0 | 63 | 102 |
| 8 | C | 1,000 | do | 107.3 | do | 36.0 | 4.3 | 1.6 | 74.5 | 71 | 98 |
| 9 | D | 1,000 | do | 100.2 | Sperm fatty acid | 90 | 2.8 | 4.6 | | 116 | 84 |
| 10 | E | 1,000 | do | 128 | do | 30 | 5.4 | 8.0 | 115.3 | 100 | 90 |
| 11 | E | 1,000 | do | 126 | Propionic acid | 8.2 | 4.8 | 2.3 | 117.6 | 123 | 103 |
| 12 | F | 1,000 | do | 128.7 | Acetic acid | 8.7 | 5.6 | 2.0 | 111.2 | 112 | 113 |
| 13 | G | 1,000 | do | 123.6 | Stearic acid | 45.8 | 4.1 | 1.8 | 90.8 | 126 | 101 |
| 14 | H | 1,000 | do | 118 | Sperm fatty acid | 195 | 4.2 | 1.8 | 41.3 | 134 | 103 |
| 15 | H | 1,000 | do | 118 | Acetic acid | 48 | 2.6 | 5.3 | 38.8 | 95 | 121 |
| 16 | J | 1,000 | do | 120 | Sperm fatty acid | 21.5 | 3.8 | 3.5 | | 93 | 108 |
| 17 | K | 1,000 | do | 117 | Propionic acid | 59 | 4.3 | 1.6 | 40.1 | 103 | 100 |
| Comparative Example: | | | | | | | | | | | |
| 1 | Z | 1,000 | do | 113.9 | Sperm fatty acid | 80.5 | 4.0 | 0.8 | | 144 | 111 |
| 2 | Z | 1,000 | do | 41.9 | Acetic acid | 18.7 | 3.2 | 2.8 | | 50 | 130 |

Starting materials of dimeric acids B–K are as follows:

| | A.V. | S.V. | L.V. | OH.V |
| --- | --- | --- | --- | --- |
| B: Methyl oleate and penol | 166.0 | 166.7 | 50.3 | 76.1 |
| C: Butyl oleate and m-cresol | 164.3 | 166.0 | 76.2 | 72.3 |
| D: Octyl oleate and anisole | 165.4 | 167.0 | 43.5 | 2.8 |
| E: Ethyl undecylenate and phenol | 199.3 | 205.3 | 59.3 | 131.6 |
| F: Methyl undecylenate and p-cresol | 223.0 | 225.7 | 63.5 | 103.7 |
| G: Butyl undecylenate and p-tert. butylphenol | 203.4 | 207.6 | 49.8 | 91.4 |
| H: Octyl esters of safflower oil fatty acids and phenol | 174.6 | 175.1 | 74.8 | 41.0 |
| J: Octyl esters of safflower oil fatty acids and phenetole | 172.5 | 175.1 | 72.3 | 1.3 |
| K: Methyl esters of safflower oil fatty acids and m-cresol | 175.8 | 176.4 | 75.6 | 39.8 |
| Z: Commercial dimer; Empol 1022 (Trademark of Emery Industry). | | | | |

EXAMPLE OF UTILIZATION

Inks were prepared from polyamides obtained in the above examples and comparative examples. Printed materials were tested by a blocking test after weathering. This test is employed generally as a deterioration promotion test.

Preparation of ink: 47.3 grams of polyamide and 6.8 g. of nitrocellulose (a product of Daicel Ltd., RS1/2) were dissolved in a solvent (mixture of 68.6 g. of toluene, 19.7 g. of isopropanol, 14.6 g. of ethanol and 5.1 g. of ethyl acetate) and then the resulting solution was milled with 15 g. of a pigment (Lyonol Red 2BL of Toyo Ink Co.) at room temperature for 15 hours.

The embodiments of the invention in which an exclusive property or privilege is claimed are defined as follows:

1. A polyamide prepared by subjecting to condensation reaction, by heating at a temperature of 200° to 250° C. for 3 to 20 hours, a reaction mixture consisting essentially of (1) from 0.476 to 0.353 equivalent of a dimeric ester which is linked through the aromatic nucleus of a phenol or a phenol derivative, or a dimeric acid obtained by hydrolysis of said dimeric ester, (2) 0.50 equivalent of a diamine of the formula:

$$R(NH_2)_2$$

wherein R is a hydrocarbon radical of 1 to 8 carbon atoms and (3) from 0.024 to 0.147 equivalent of a monofunctional reactant comprising a fatty acid of 1 to 24 carbon atoms, to produce the polyamide, said dimeric ester having been obtained by the acid catalyzed addition polymerization of (a) 2 moles of an ester being an unsaturated higher monomeric aliphatic acid having 10 to 22 carbon atoms esterified with a saturated alcohol having from 1 to 8 carbon atoms and (b) 1 mole of phenol compound being phenol or a phenol derivative of the general formula:

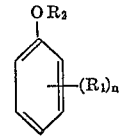

wherein $R_1$ is an alkyl group of 1 to 4 carbon atoms or OH, $R_2$ is H, $CH_3$ or $CH_3CH_2$ and $n$ is 0, 1 or 2, provided that at least two of the o- and p-positions to $OR_2$ are substituted.

2. The polyamide of claim 1, in which the said ester is a member selected from the group consisting of alkyl esters of oleic acid, alkyl esters of undecylenic acid and alkyl esters of safflower oil fatty acids; and the phenol compound is selected from the group consisting of phenol, cresol, anisole, butylphenol and phenetole.

3. The polyamide of claim 1 in which the diamine is ethylenediamine.

4. The polyamide of claim 2, in which the phenol compound is phenol.

5. The polyamide of claim 2, in which the phenol compound is a cresol.

References Cited
UNITED STATES PATENTS

| | | | |
|---|---|---|---|
| 3,522,270 | 7/1970 | Glaser | 260—18 |
| 3,420,789 | 1/1969 | Wilson | 260—18 |
| 3,037,871 | 6/1962 | Floyd et al. | 260—18 |
| 2,374,576 | 4/1945 | Brubaker | 260—18 |
| 2,577,041 | 12/1951 | Seymore | 260—47 |
| 3,268,461 | 8/1966 | Jacobson | 260—18 |
| 3,483,149 | 12/1969 | Gresenz et al. | 260—18 |
| 3,597,376 | 8/1971 | Tashiro et al. | 260—18 |

DONALD E. CZAJA, Primary Examiner

E. C. RZUCIDLO, Assistant Examiner

U.S. Cl. X.R.

106—27; 260—47 CZ, 404.5